(12) United States Patent
Craig et al.

(10) Patent No.: US 8,667,660 B2
(45) Date of Patent: Mar. 11, 2014

(54) QUICK CHANGE CLAMPING DEVICE (75) Inventors: Karen Anne Craig, Greensburg, PA (US); Kenneth George Deroche, Greensburg, PA (US)

(73) Assignee: Kennametal Inc., Latrobe, PA (US)

( * ) Notice: Subject to any disclaimer, the term of this patent is extended or adjusted under 35 U.S.C. 154(b) by 428 days.

(21) Appl. No.: 13/109,262

(22) Filed: May 17, 2011

(65) Prior Publication Data

US 2012/0292863 A1 Nov. 22, 2012

(51) Int. Cl.
*B23P 11/02* (2006.01)
*B23B 31/10* (2006.01)

(52) U.S. Cl.
USPC .............................................. 29/453; 279/20

(58) Field of Classification Search
USPC ............. 29/453, 447, 428, 243; 279/20, 46.1, 279/53, 46.9
See application file for complete search history.

(56) References Cited

U.S. PATENT DOCUMENTS

| | | | |
|---|---|---|---|
| 1,191,755 A | 7/1916 | Andrews | |
| 2,374,919 A | 5/1945 | Bruseth | |
| 4,740,122 A | 4/1988 | Glaser | |
| 5,957,467 A * | 9/1999 | Hornung | 279/49 |
| 2010/0140882 A1 | 6/2010 | McCormick et al. | |

* cited by examiner

*Primary Examiner* — John C Hong
(74) *Attorney, Agent, or Firm* — Larry R. Meenan, Esq.

(57) ABSTRACT

A clamping assembly for a toolholder includes a toolholder body having an access hole. A locking sleeve is slidably disposed within the access hole and a center collet is disposed within the locking sleeve and is fixedly connected to the toolholder body. The center collet receives a retaining tip of a tool. A spring assembly and a release device cause the locking sleeve to move within the access hole between a load position, where the locking sleeve is disengaged from the center collet such that the center collet is open and a lock position, where the locking sleeve engages the center collet such that the center collet is closed and locks the retaining tip of the tool within the access hole.

20 Claims, 8 Drawing Sheets

QUICK CHANGE CLAMPING DEVICE

BACKGROUND OF THE INVENTION

1. Field of the Invention

The invention is directed to tooling for machining operations and, more particularly, directed to a clamping device for securing a tool to a toolholder body.

2. Description of Related Art

Clamping systems that utilize a collet or similar device for securing a tool to a machine tool or intermediate toolholder are well known. The collets generally comprise a tubular body formed from a plurality of elongated, flexible fingers. The fingers are separated by longitudinal collet slots that impart a degree of radial flexibility to the collet, which allows the collet to selectively grip the shank of a cutting tool, such as a drill bit. The collet is inserted in a complementary-shaped opening in the toolholder so that an end of the collet is accessible through the opening in the toolholder. Such systems generally require side or rear actuation of the collet by a screw or cam to cause the collet to radially compress and clamp around a shank of the tool without direct contact to the radially flexing portions of the collet. Such systems may also require the collet to be physically moved within the toolholder.

Accordingly, typical prior art systems require a complex construction of components to actuate the collet, which may be cost prohibitive and be too large depending on the tooling application and require complicated machining of the toolholder itself. The collet itself may not be accurately positioned within the toolholder and gage height of the collet may be difficult to maintain during assembly, maintenance, and use. Movement and wear of the collet may reduce the gripping force and loosen the clamping connection between the collet and the tool, leading to inaccuracies in machining operations. Further, due to the high clamping forces involved, the shank of the tool may become stuck within the toolholder and difficult to remove without disrupting the position of the collet.

SUMMARY OF THE INVENTION

Accordingly, there is a general need for a clamping assembly for a toolholder that achieves direct radial compression of a collet while accurately maintaining the position and gage height of the collet, with respect to the toolholder, and utilizes simple components to reduce the size of the assembly and simplify operation and maintenance.

According to one embodiment of the present invention, a quick change clamping device is provided that achieves clamping of a retaining tip of a tool through spring pressure and the use of direct radial compression of a collet and a low angle taper to activate a higher angle taper to lock the retaining tip of the tool within the collet. The clamping device further includes a "bump off" feature that ejects the tool from the toolholder during removal of the clamped tool. The mating retaining tip portion of the tool has a reverse taper to facilitate an interlocking engagement between the retaining tip and the collet.

The clamping device may utilize simple, standardized, components to achieve a compact design. For instance, the clamping device may be utilized with tools having a 19 mm diameter. The clamping device may also be installed in a simplified pocket structure formed in the toolholder body. The clamping device could allow for easy maintenance and assembly and quick turnaround of different tools while maintaining the gage height of the collet to preserve overall accuracy.

According to one particular embodiment of the present invention, a clamping assembly for a toolholder is provided. The assembly includes a toolholder body having an access hole defined therein, the access hole extending into the toolholder body from a toolholder face of the toolholder body to a base surface; a locking sleeve slidably disposed within the access hole, the locking sleeve extending between a sleeve face and a base surface and having an interior surface defining a hollow cavity, the interior surface including an engaging portion extending into the hollow cavity; a center collet disposed within the hollow cavity of the locking sleeve and fixedly connected to the toolholder body, the center collet including a gripping portion having an interior surface defining a recess and an exterior surface, the gripping portion being adapted to receive a retaining tip of a tool therein; a spring assembly disposed within the hollow cavity of the locking sleeve and engaging the center collet and the locking sleeve to bias the locking sleeve toward the base surface of the access hole; and a release device engaging the locking sleeve. The spring assembly and the release device are configured to cause the locking sleeve to move within the access hole between a load position where the engaging portion of the locking sleeve is disengaged from the exterior surface of the gripping portion of the center collet such that the center collet is open and the recess is able to receive the retaining tip of the tool and a lock position where the engaging portion of the locking sleeve engages the exterior surface of the gripping portion of the center collet such that the center collet is closed and locks the retaining tip of the tool within the access hole.

According to another particular embodiment of the present invention, a tool and toolholder assembly is provided. The assembly includes a tool having a tool seating face and a retaining tip extending from the tool seating face; a toolholder body having an access hole defined therein, the access hole extending into the toolholder body from a toolholder face of the toolholder body to a base surface; a locking sleeve slidably disposed within the access hole, the locking sleeve extending between a sleeve face and a base surface and having an interior surface defining a hollow cavity, the interior surface including an engaging portion extending into the hollow cavity; a center collet disposed within the hollow cavity of the locking sleeve and fixedly connected to the toolholder body, the center collet including a gripping portion having an interior surface defining a recess and an exterior surface, the gripping portion being adapted to receive the retaining tip of the tool therein; a spring assembly disposed within the hollow cavity of the locking sleeve and engaging the center collet and the locking sleeve to bias the locking sleeve toward the base surface of the access hole; and a release device engaging the locking sleeve. The spring assembly and the release device are configured to cause the locking sleeve to move within the access hole between a load position where the engaging portion of the locking sleeve is disengaged from the exterior surface of the gripping portion of the center collet such that the center collet is open and the recess is able to receive the retaining tip of the tool and a lock position where the engaging portion of the locking sleeve engages the exterior surface of the gripping portion of the center collet such that the center collet is closed and locks the retaining tip of the tool within the access hole.

According to still another particular embodiment of the present invention, a method of connecting a tool to a toolholder is provided. The method includes the steps of providing a tool having a tool seating face and a retaining tip extending from the tool seating face, and providing a toolholder having a clamping assembly. The clamping assembly includes a toolholder body having an access hole defined therein, the access hole extending into the toolholder body from a toolholder face of the toolholder body to a base surface; a locking sleeve slidably disposed within the access hole, the locking sleeve extending between a sleeve face and a base surface and having an interior surface defining a hollow cavity, the interior surface including an engaging portion extending into the hollow cavity; a center collet disposed within the hollow cavity of the locking sleeve and fixedly connected to the toolholder body, the center collet including a gripping portion having an interior surface defining a recess and an exterior surface, the gripping portion being adapted to receive the retaining tip of the tool therein; a spring assembly disposed within the hollow cavity of the locking sleeve and engaging the center collet and the locking sleeve to bias the locking sleeve toward the base surface of the access hole; and a release device engaging the locking sleeve. The release device is actuated to engage the locking sleeve to move the locking sleeve within the access hole to a load position where the engaging portion of the locking sleeve is disengaged from the exterior surface of the gripping portion of the center collet such that the center collet is open. The retaining tip of the tool is then inserted into the recess of the gripping portion. The release device is then actuated to engage the locking sleeve such that the spring assembly moves the locking sleeve within the access hole to a locked position where the engaging portion of the locking sleeve engages the exterior surface of the gripping portion of the center collet such that the center collet is closed and locks the retaining tip of the tool within the access hole.

Further details and advantages of the various embodiments of the invention detailed herein will become clear upon reviewing the following detailed description of the preferred embodiments in conjunction with the accompanying drawing figures.

DETAILED DESCRIPTION OF THE INVENTION

For purposes of the description hereinafter, spatial orientation terms, as used, shall relate to the referenced embodiment as it is oriented in the accompanying drawing figures or otherwise described in the following detailed description. However, it is to be understood that the embodiments described hereinafter may assume many alternative variations and configurations. It is also to be understood that the specific components, devices, and features illustrated in the accompanying drawing figures and described herein are simply exemplary and should not be considered as limiting.

Figure 1:
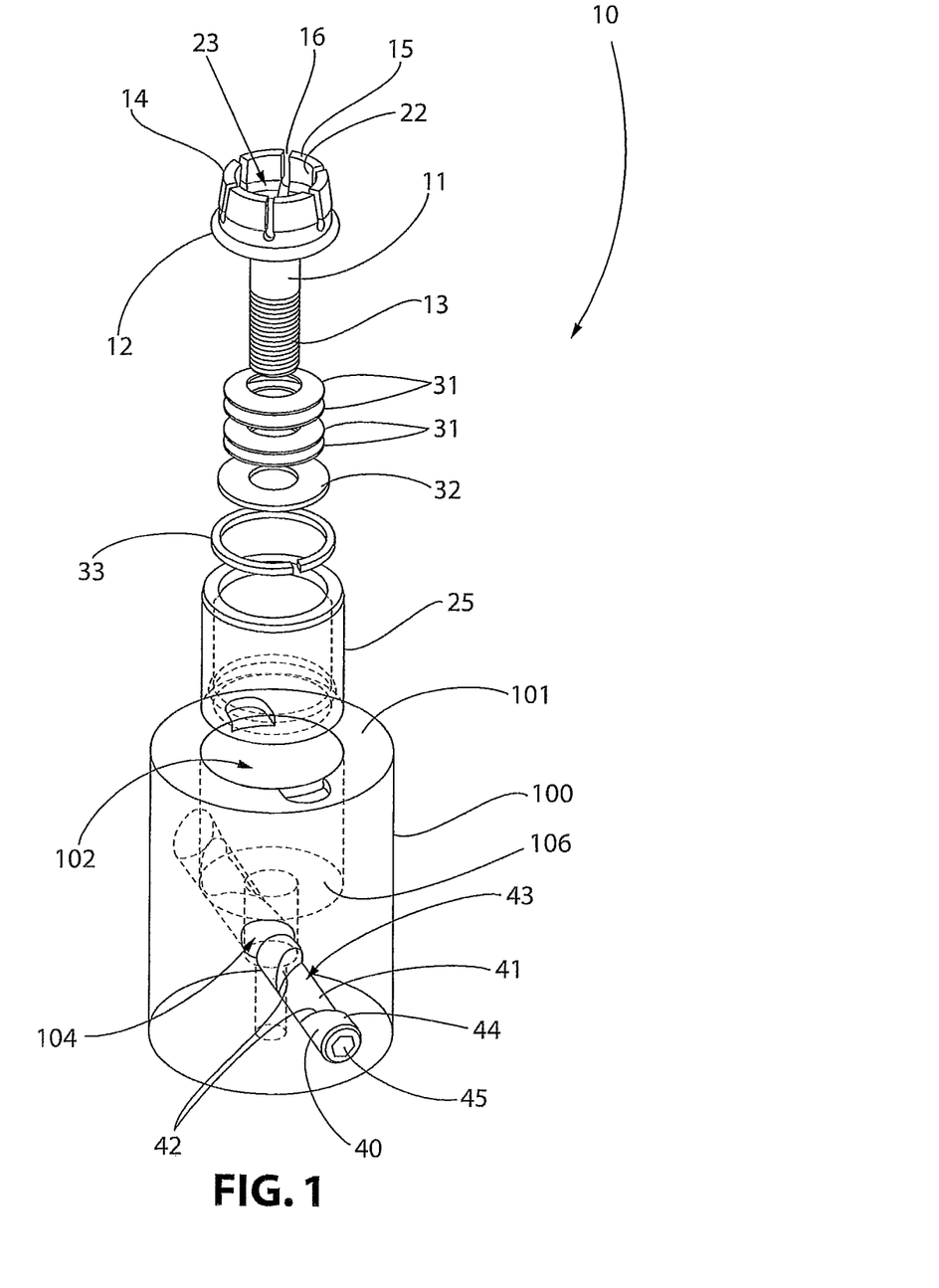
FIG. 1 is an exploded perspective view of a clamping assembly for a toolholder according to an embodiment of the present invention.
Figure 2:
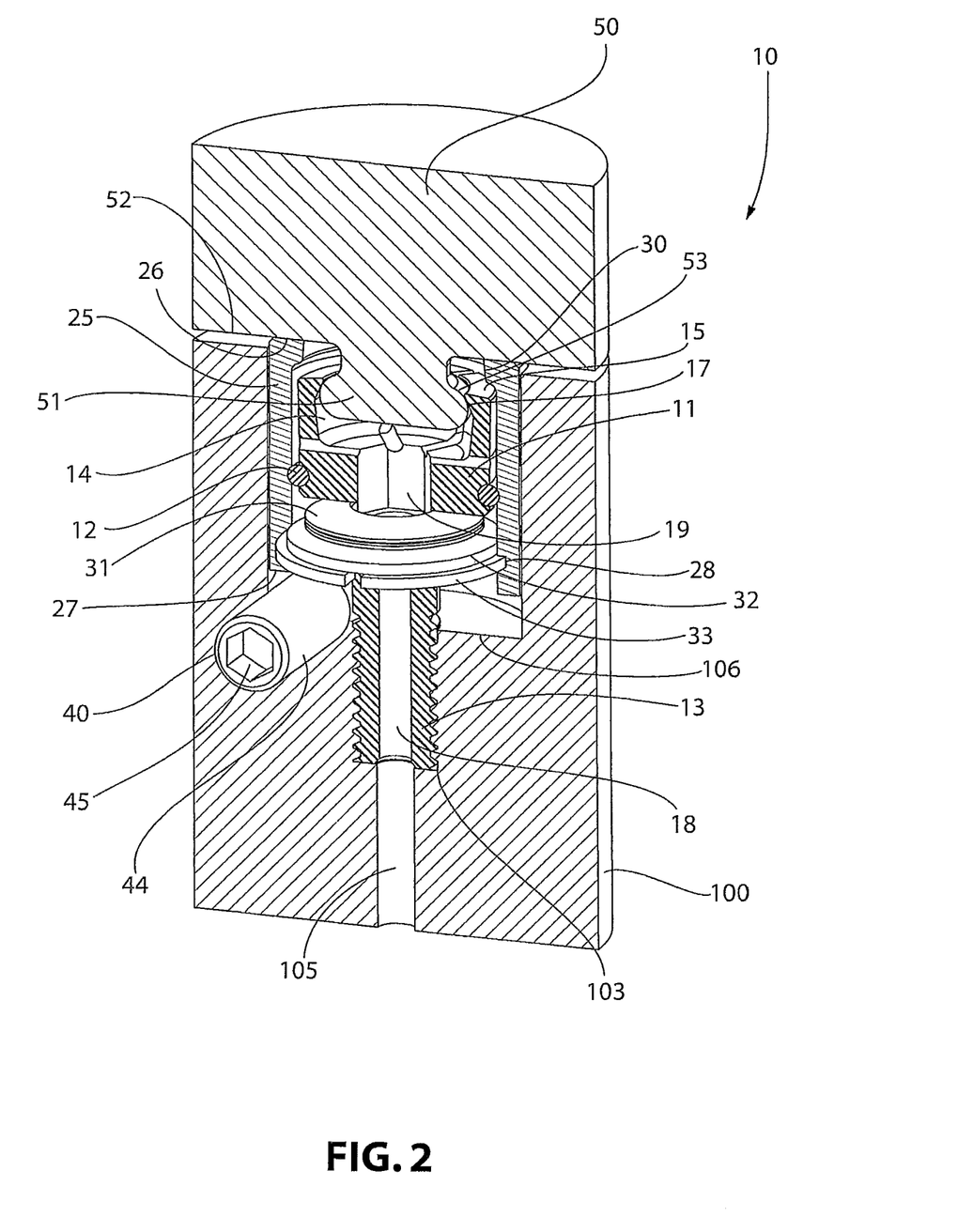
FIG. 2 is a cross-sectional perspective view of the clamping assembly of FIG. 1 and a portion of a tool in an ejection condition.
Figure 3:
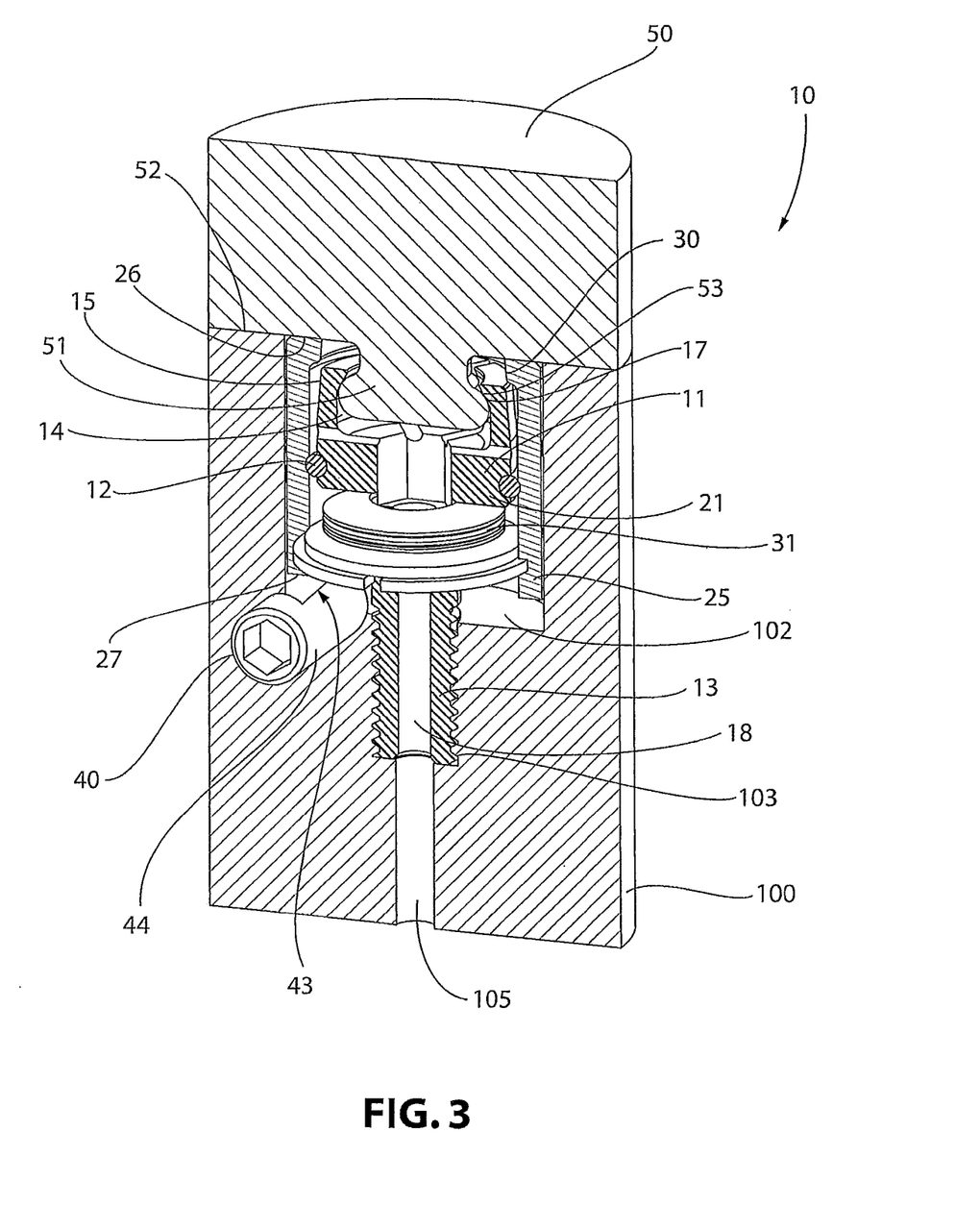
FIG. 3 is a cross-sectional perspective view of the clamping assembly of FIG. 1 and a portion of the tool in a load condition.
Figure 7:
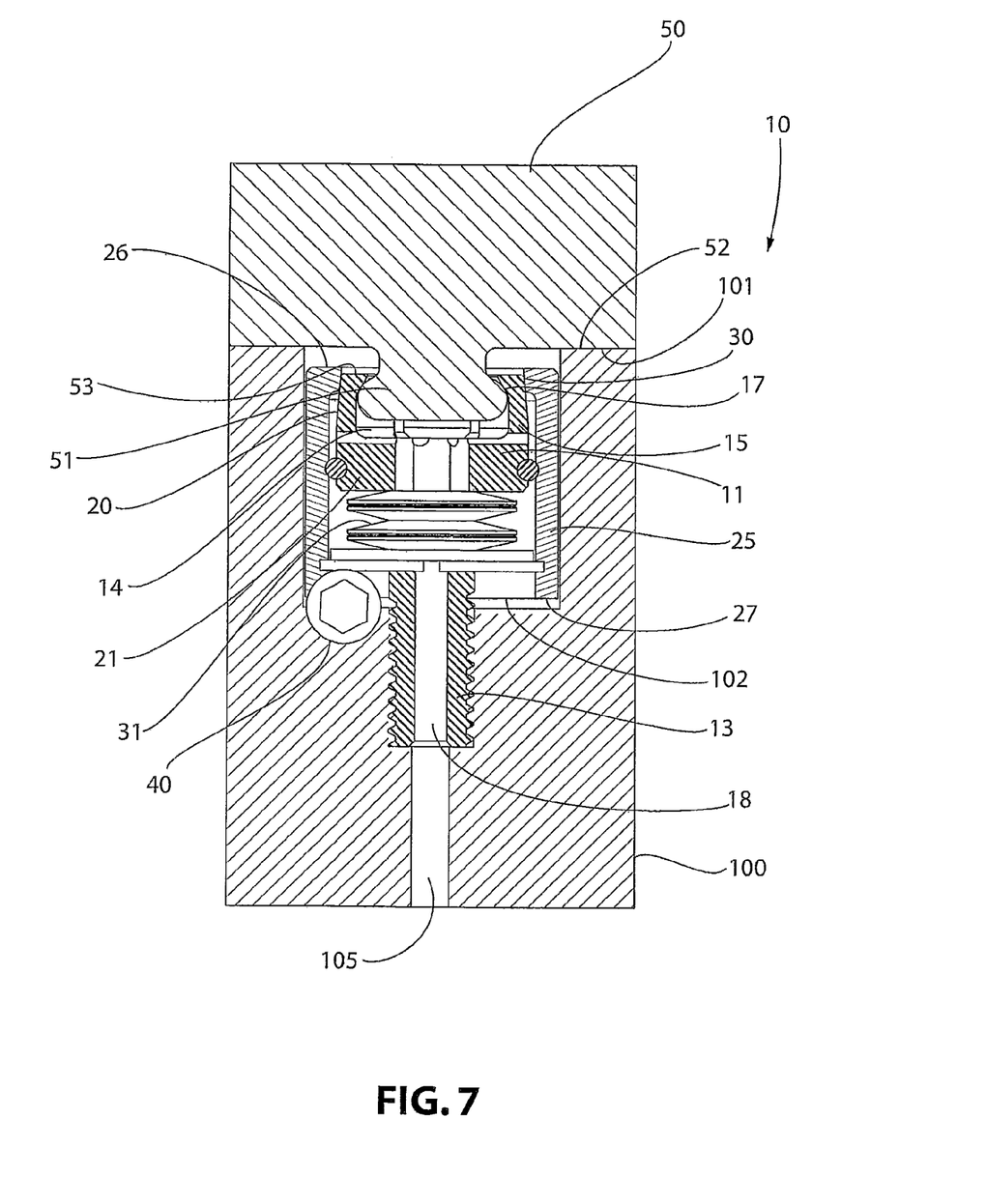
FIG. 7 is a cross-sectional side view of the clamping assembly of FIG. 1 and a portion of the tool in the locked condition.
Figure 8:
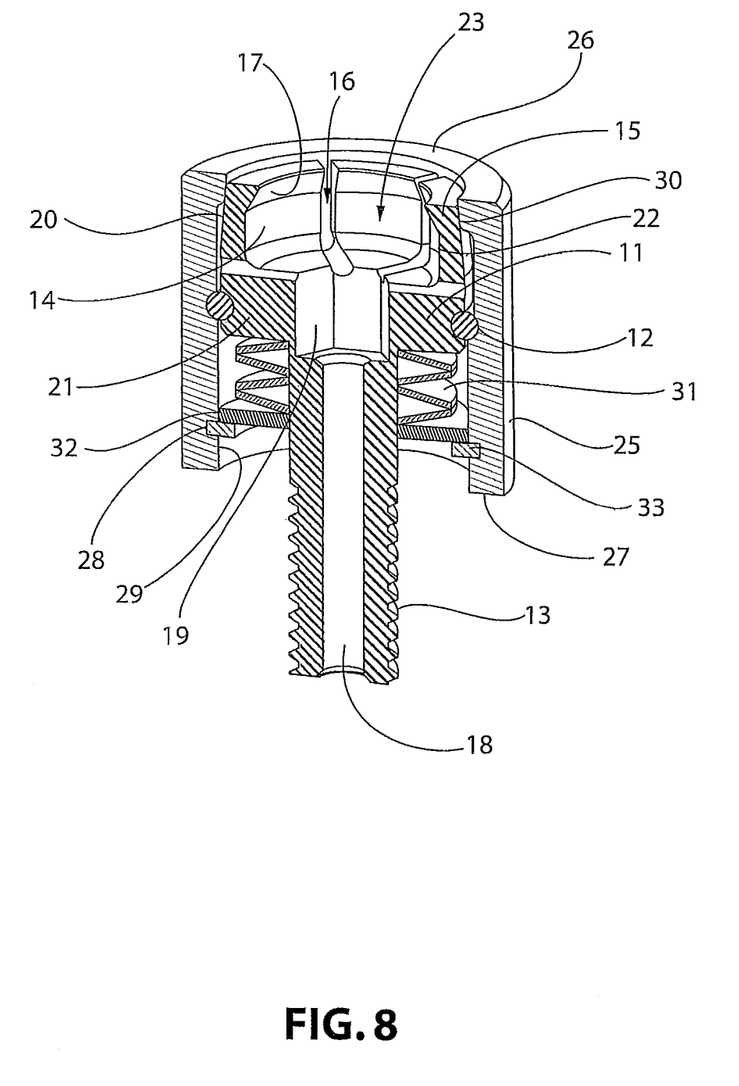
FIG. 8 is a cross-sectional perspective view of an assembled portion of the clamping assembly of FIG. 1.

With reference to FIGS. 1 and 8, a clamping assembly 10 for a toolholder according to an embodiment of the present invention is depicted. As illustrated in FIGS. 2-7, the clamping assembly 10 is used to connect and secure the end of a tool 50, such as a cutting tool, to the toolholder. The tool 50 has a tool seating face 52 and a retaining tip 51 extending from the tool seating face 52.

As shown in FIGS. 1 and 8, the clamping assembly 10 includes a toolholder body 100 having an access hole 102 defined in the toolholder body 100. The access hole 102 extends into the toolholder body 100 from a toolholder face 101 of the toolholder body 100 to a base surface 106. A locking sleeve 25 is slidably disposed within the access hole 102. The locking sleeve 25 extends between a sleeve face 26 oriented toward the toolholder face 101 and a base surface 27 oriented toward the base surface 106 of the access hole 102. The locking sleeve 25 has an interior surface 29 that defines a hollow cavity. The interior surface 29 of the locking sleeve 25 includes an engaging portion 30 that extends into the hollow cavity. As shown in FIG. 8, the engaging portion 30 is an interior flange positioned adjacent to and forming a portion of the sleeve face 26.

A center collet 11 is disposed within the hollow cavity of the locking sleeve 25 and is fixedly connected to the toolholder body 100. As shown in FIGS. 1 and 8, the center collet 11 includes a gripping portion 14 having an interior surface 22 that defines a recess 23, which is adapted to receive the retaining tip 51 of the tool 50, and an exterior surface 20 that defines a periphery of the gripping portion 14. The interior surface 22 and the exterior surface 20 of the gripping portion 14 of the center collet 11 are defined by a plurality of gripping fingers 15, which are separated by slots 16 and extend from a base 21 of the gripping portion 14. The gripping fingers 15 surround the recess 23 and are resiliently flexible to engage and secure the retaining tip 51 of the tool 50, while allowing the retaining tip 51 to be inserted and removed from the recess 23 of the gripping portion 14. To promote the resilient flexibility of the fingers 15, the center collet 11 may be formed from a resilient material, such as spring steel. It is to be appreciated that the center collet 11 may be formed of any material known to be suitable to those having ordinary skill in the art.

Figure 5:
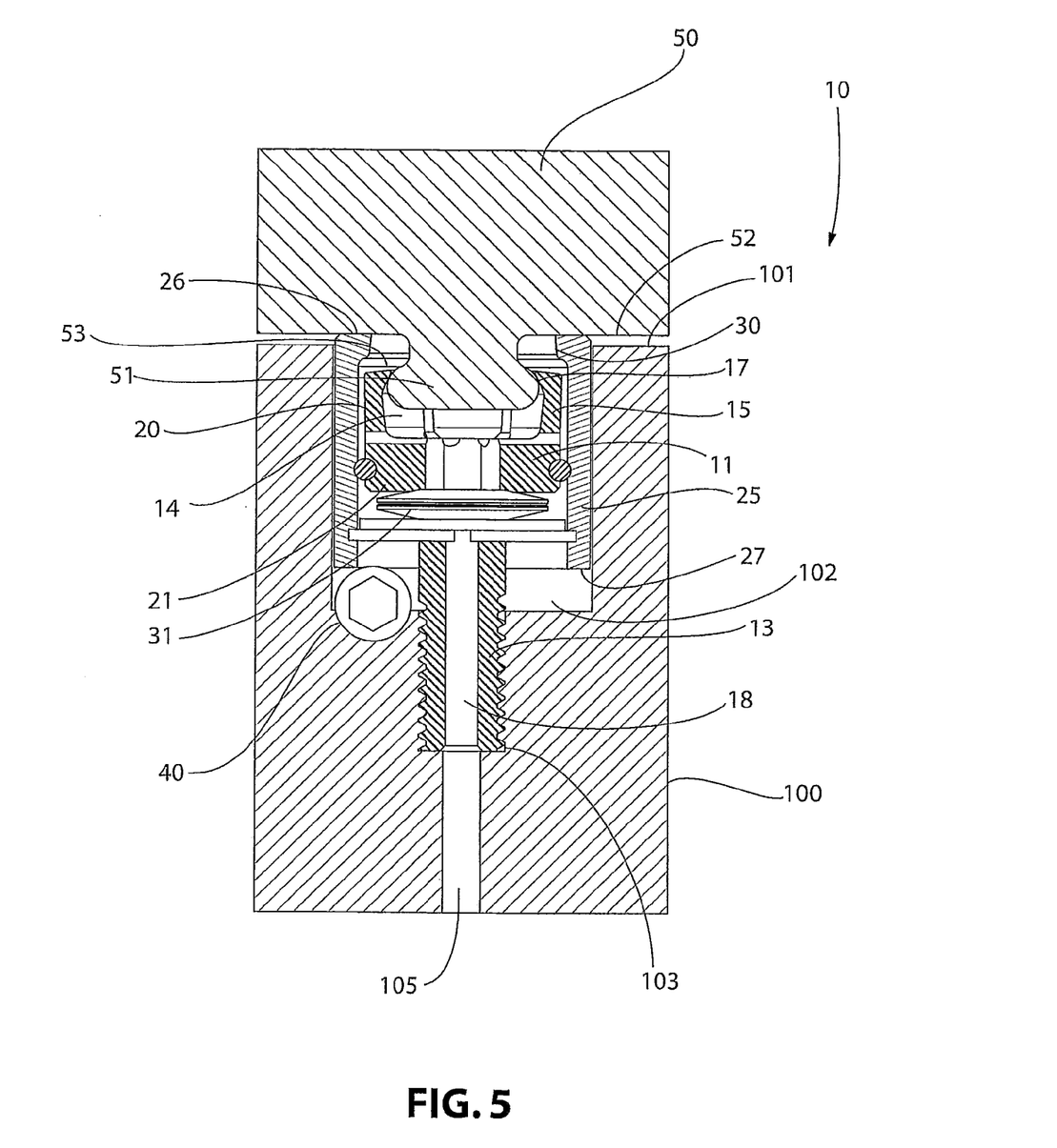
FIG. 5 is a cross-sectional side view of the clamping assembly of FIG. 1 and a portion of the tool in the ejected condition.
Figure 6:
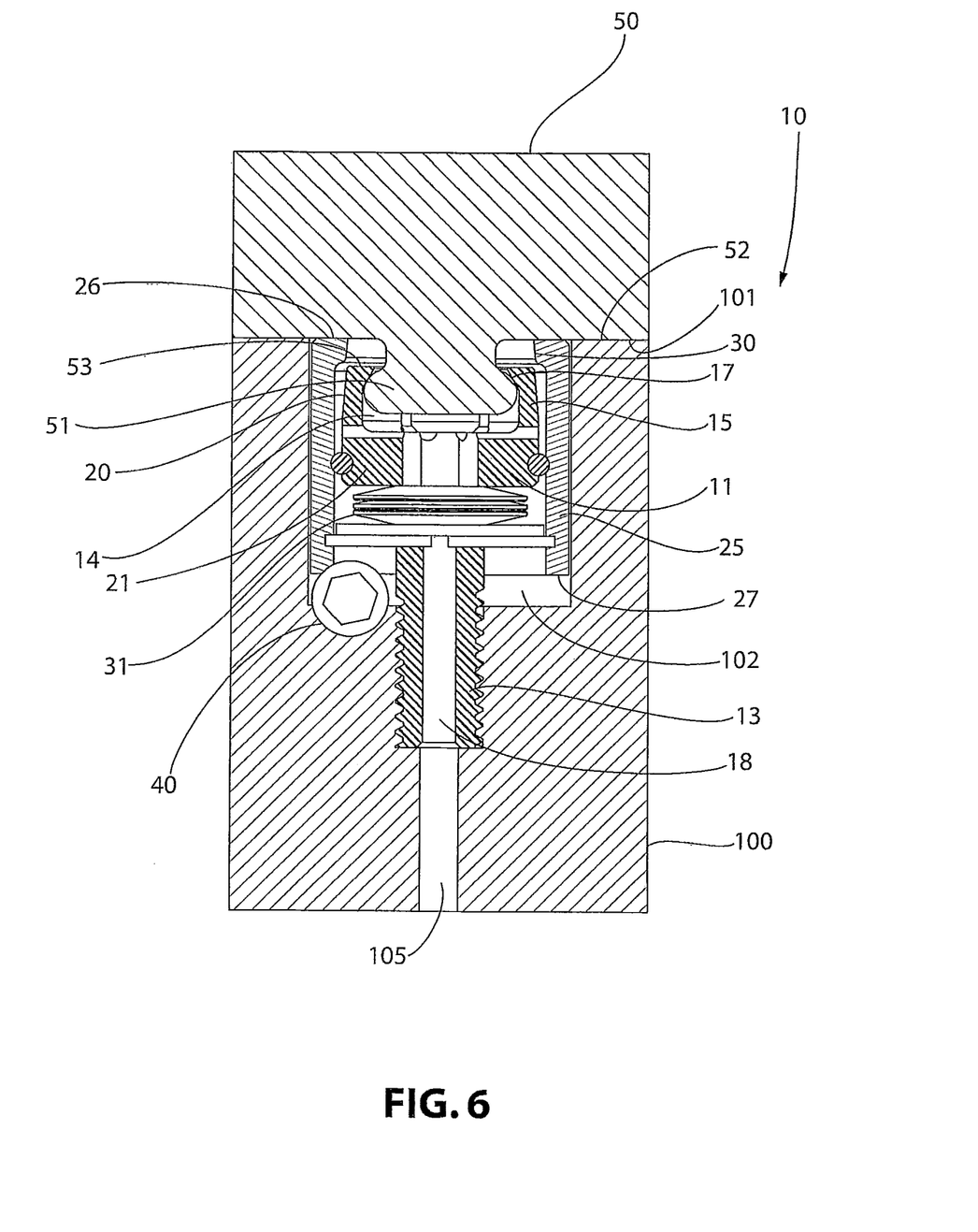
FIG. 6 is a cross-sectional side view of the clamping assembly of FIG. 1 and a portion of the tool in the load condition.

As shown in FIGS. 5-7, the exterior surface 20 of the gripping portion 14 is tapered with a low degree of taper. According to an embodiment of the present invention, the angle of the taper of the exterior surface 20 is less than 20° with respect to a length direction of the center collet 11 when the fingers 15 of the gripping portion 14 are in an unflexed condition. It is to be appreciated that the taper may be of any angle found to be suitable by those having ordinary skill in the art.

Figure 4:
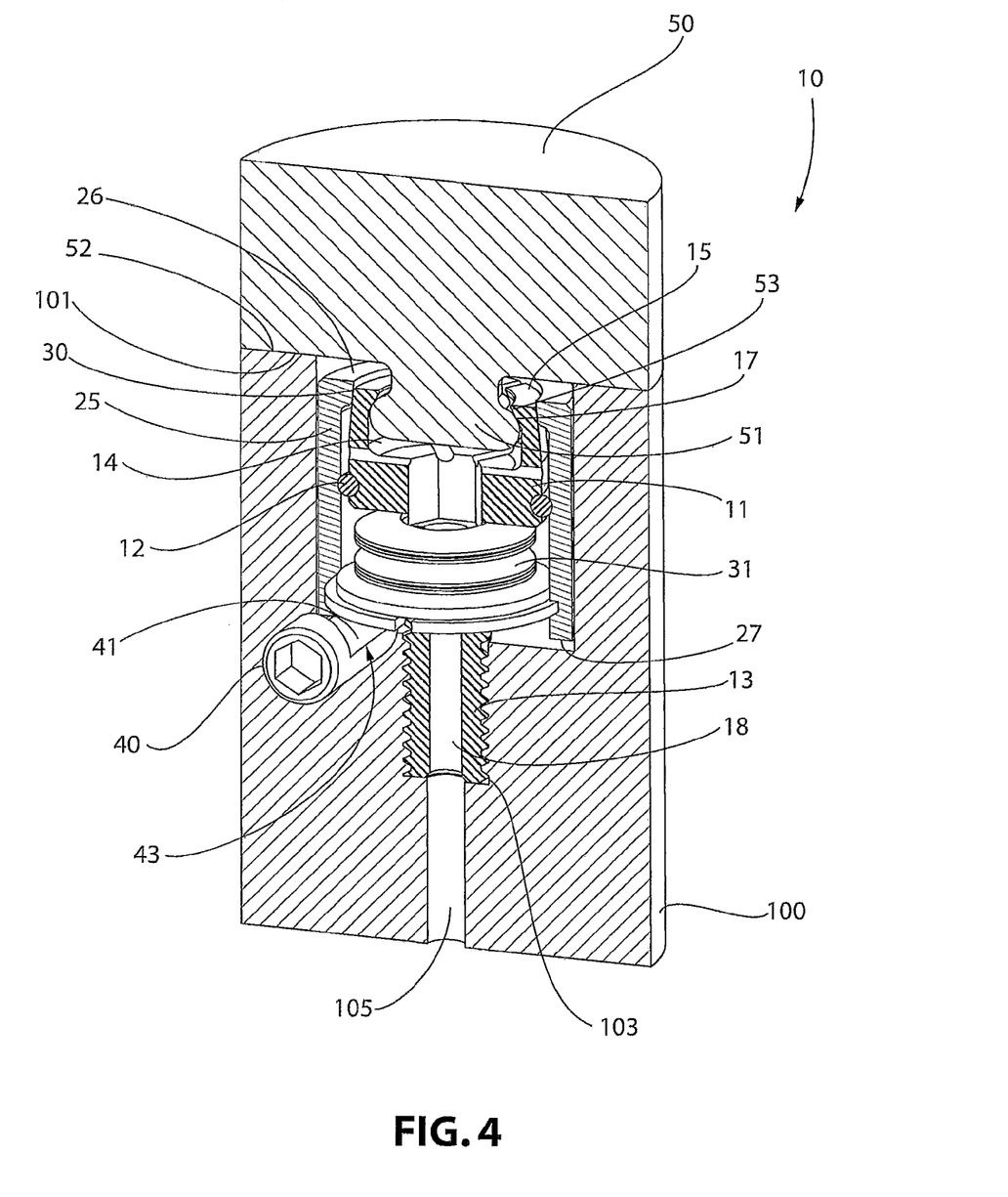
FIG. 4 is a cross-sectional perspective view of the clamping assembly of FIG. 1 and a portion of the tool in a locked condition.

The interior surface 22 of the gripping portion 14 includes a tapered flange 17 that extends across the tips of the gripping fingers 15 and surrounds the recess 23. As shown in FIGS. 4 and 7, the tapered flange 17 engages a reverse tapered surface 53 formed on the retaining tip 51 of the tool 50 in an interlocking manner when the locking sleeve 25 is in the lock position and the center collet 11 is closed. The tapered flange 17 has a high degree of taper. According to an embodiment of the present invention, the angle of the taper of the tapered flange 17 is greater than or equal to 20° with respect to a length direction of the center collet 11 when the fingers 15 of the gripping portion 14 are in an unflexed condition. It is to be appreciated that the taper may be of any angle found to be suitable by those having ordinary skill in the art. The reverse tapered surface 53 of the retaining tip 51 has a corresponding angle of taper to facilitate an interlocking engagement between the center collet 11 and the retaining tip 51 to secure the retaining tip 51 in the collet 11 and connect the tool 50 with the toolholder body 100.

As shown in FIGS. 1 and 8, the center collet 11 also includes a sealing member 12, such as an O-ring, that extends around the base 21 of the gripping portion 14 and engages the interior surface 29 of the locking sleeve 25 to seal the engagement between the locking sleeve 25 and the center collet 11. The center collet 11 includes a threaded portion 13 that extends from the base 21 of the gripping portion 14. The toolholder body 100 includes a threaded hole 103 defined therein that extends into the toolholder body 100 from the base surface 106 of the access hole 102. The threaded portion 13 of the center collet 11 engages the threaded hole 103 in the toolholder body to fixedly connect the center collet 11 to the toolholder body 100. To that end, the base 21 of the gripping portion 14 and the threaded portion 13 may have a hexagonal recess 19 defined therein and opening into the recess 23. The recess 19 is engageable with a hexagonal wrench or similar tool to fixedly connect the center collet 11 to the toolholder body 100. It is to be appreciated that the recess 19 may be of any shape or configuration known to be suitable to those having ordinary skill in the art. The threaded portion 13 also includes a coolant channel 18 defined therein and in fluid communication with the recess 19. The toolholder body 100 also includes a coolant hole 105 defined therein, which extends through the toolholder body 100 to the threaded hole 103. The coolant hole 103 of the toolholder body 100 is in fluid communication with the coolant channel 18 of the center collet 11 so that coolant fluid may be conveyed to the tool 50 by way of the coolant hole 105, the coolant channel 18, the hexagonal recess 19, and the recess 23 of the gripping portion 14. The tool 50 may also include a coolant channel (not shown) passing through the retaining tip 51 and the tool 50 to direct the coolant fluid to the cutting portion of the tool.

A spring assembly is disposed within the hollow cavity of the locking sleeve 25 about the threaded portion 13 of the center collet 11 and engages the center collet 11 and the locking sleeve 25 to bias the locking sleeve 25 toward the base surface 106 of the access hole 102. The spring assembly includes a plurality of Belleville washers 31 disposed beneath and engaging the base 21 of the gripping portion 14 of the center collet 11, a flat washer 32 for supporting the Belleville washers 31, and a snap ring 33. The snap ring 33 engages an annular groove 28 formed in the interior surface 29 of the locking sleeve 25. The snap ring 33 retains and supports the flat washer 32 and the Belleville washers 31 between the base 21 of the gripping portion 14 and the base surface 27 of the locking sleeve 25.

The clamping assembly 10 also includes a release device 40 that engages the locking sleeve 25. As shown in FIGS. 1-4, the release device is a rotatable pin 40 that is positioned within a transverse bore 104 that extends through the toolholder body 100 in a direction non-parallel to the access hole 102 and at least partially intersects with the access hole 102. As shown, the transverse bore 104 is perpendicular to the access hole 102. It is to be appreciated that the bore 104 may be positioned in the toolholder body 100 at any angle, with respect to the access hole 102, known to be suitable by those having ordinary skill in the art. The rotatable pin 40 has an outer diameter 44 and a recessed portion 41 that collectively define a cam profile 43 that engages the base surface 27 of the locking sleeve 25. Particularly, the recessed portion 41 of the rotatable pin 40 has a shape, defined by opposing curved walls 42 and a flat bottom, which corresponds to the base surface 27 of the locking sleeve 25 such that the base surface 27 is able to sit within the recessed portion 41. The rotatable pin may also include a recess 45 formed in the end thereof for engagement by a hex wrench or similar tool to actuate the rotatable pin.

The spring assembly and the release device 40 are configured to cause the locking sleeve 25 to move within the access hole 102 between a load position (shown in FIGS. 3 and 6), where the engaging portion 30 of the locking sleeve 25 is disengaged from the exterior surface 20 of the gripping portion 14 of the center collet 11 so that the center collet 11 is open and the recess 23 is able to receive the retaining tip 51 of the tool 50, and a lock position (shown in FIGS. 4 and 7), where the engaging portion 30 of the locking sleeve 25 engages the exterior surface 20 of the gripping portion 14 of the center collet 11 so that the center collet is closed and locks the retaining tip 51 of the tool 50 within the access hole 102. The release device 40 is also configured to move the locking sleeve 25 to an ejection position where the sleeve face 26 of the locking sleeve 25 protrudes from the access hole 102 beyond the toolholder face 101 and engages the tool seating face 101 to push the tool 50 away from the toolholder body 100.

Again referring to FIGS. 1 and 8, the clamp assembly 10 is assembled by first placing the Belleville washers 31, the flat washer 32, and the snap ring 33 on the threaded portion 13 of the center collet 11 to form the spring assembly. The collet 11 and the spring assembly are then inserted into the hollow cavity of the locking sleeve 25 from the base surface 27 of the locking sleeve 25 and the snap ring 33 is engaged with the annular groove 28 in the interior surface 29 of the locking sleeve 25. The assembled locking sleeve 25, collet 11, and spring assembly are then screwed into the toolholder body 100 with a hex wrench or similar tool such that the assembly is positioned within the access hole 102. A stop, such as the base of the threaded hole 103 of the toolholder body 100 is provided so that the gage height of the center collet 11, with respect to the access hole 102, may be accurately set during production and maintained through use and maintenance of the clamping assembly 10.

It is to be appreciated that various components described above may be altered and/or replaced by similar components known to be suitable by those having ordinary skill in the art. For instance, the Belleville washers 31 may be replaced with a standard coil spring or the like. The rotatable pin 40 may be replaced with a beveled or tapered pin that is appropriately inserted or extracted from the toolholder body 100. The gripping portion 14 of the center collet 11 may have a different resiliently collapsible configuration and may be connected to the toolholder body 100 by varying mechanism. Also, the components may be formed from a variety of known materials dependent upon the relevant application and use conditions of the tool 50 and the clamp assembly 10.

With reference to FIGS. 2-7, a method of connecting the tool 50 to the toolholder body 100, according to an embodiment of the present invention, involves providing the tool 50 and the toolholder clamping assembly 10 described above. To load the tool 50 to the toolholder body 100, the rotatable pin 40 is actuated to engage the base surface 27 of the locking sleeve 25 with the cam profile 43 to move the locking sleeve 25 within the access hole 102 to a load position (shown in FIGS. 3 and 6) where the sleeve face 26 is positioned at or slightly above the toolholder face 101 and the engaging portion 30 of the locking sleeve 25 is disengaged from the exterior surface 20 of the gripping portion 14 of the center collet 11 such that the collet 11 is open and the gripping fingers 15 are able to spread apart. The retaining tip 51 of the tool 50 is then inserted into the recess 23 of the gripping portion 14 of the open collet 11, which holds the tool seating face 52 loosely against the toolholder face 101 and/or the sleeve face 26.

Once the retaining tip 51 of the tool 50 is positioned within the open collet 11, the rotatable pin 40 is actuated to engage the locking sleeve 25 such that the locking sleeve 25 is able to be moved within the access hole 102 by the spring assembly into the recessed portion 41 of the rotatable pin 40 to a locked positioned (shown in FIGS. 4 and 7), where the locking sleeve 25 is pressed into the access hole 102 by spring pressure. In the locked position, the engaging portion 30 of the locking sleeve 25 engages and rides along the tapered exterior surface 20 of the gripping portion 14 of the collet 11. This increasing pressure on the tapered exterior surface 20 causes gripping fingers 15 to flex inward to close the collet 11 about the retaining tip 51 of the tool 50. As the collet 11 is closed, the highly tapered interior flange 17 collectively defined by the gripping fingers 15 engages the reverse tapered surface 53 on the retaining tip 51 to squeeze and pull the retaining tip 51 into the recess 23 of the collet and lock the retaining tip 51 within the access hole 102 due to the interlocking engagement between the center collet 11 and the retaining tip 51 formed by the interior flange 17 and the reverse tapered surface 53. In this manner, the low angle taper of the exterior surface 20 of the gripping portion 14 is utilized to activate the higher angle taper of the interior flange 17 to lock the retaining tip 51 within the collet 11. As shown in FIGS. 4 and 7, the tool seating face 52 firmly engages with the toolholder face 101 in the locked condition.

To eject the tool 50 from the toolholder body 100, the rotatable pin 40 is actuated to engage the base surface 27 of the locking sleeve 25 until the base surface engages the outer diameter 44 of the rotatable pin and the sleeve 25 is pushed to an ejection position (shown in FIGS. 2 and 5), where the sleeve face 26 of the locking sleeve 25 protrudes from the access hole 102 beyond the toolholder face 101 and engages the tool seating face 52 to push the tool 50 away from the toolholder body 100. At this position, the retaining tip 51 is easily removed from the collet 11. The rotatable pin 40 may then be actuated such that the locking sleeve 25 is returned to the load position for insertion of another tool 50.

Throughout this description, the terms tool and toolholder have been used to describe the two mating components. It should be appreciated that this term, as used herein, may describe any variety of attachments used to secure a cutting tool to a machine tool. While specific embodiments of the invention have been described in detail, it will be appreciated by those skilled in the art that various modifications and alternatives to those details could be developed in light of the overall teachings of the disclosure. The presently preferred embodiments described herein are meant to be illustrative only and not limiting as to the scope of the invention which is to be given the full breadth of the appended claims and any and all equivalents thereof.

The invention claimed is:

1. A clamping assembly for a toolholder, comprising:
    a toolholder body having an access hole defined therein, the access hole extending into the toolholder body from a toolholder face of the toolholder body to a base surface;
    a locking sleeve slidably disposed within the access hole, the locking sleeve extending between a sleeve face and a base surface and having an interior surface defining a hollow cavity, the interior surface including an engaging portion extending into the hollow cavity;
    a center collet disposed within the hollow cavity of the locking sleeve and fixedly connected to the toolholder body, the center collet including a gripping portion having an interior surface defining a recess and an exterior surface, the gripping portion being adapted to receive a retaining tip of a tool therein;
    a spring assembly disposed within the hollow cavity of the locking sleeve and engaging the center collet and the locking sleeve to bias the locking sleeve toward the base surface of the access hole; and
    a release device engaging the locking sleeve,
    wherein the spring assembly and the release device are configured to cause the locking sleeve to move within the access hole between a load position where the engaging portion of the locking sleeve is disengaged from the exterior surface of the gripping portion of the center collet such that the center collet is open and the recess is able to receive the retaining tip of the tool and a lock position where the engaging portion of the locking sleeve engages the exterior surface of the gripping portion of the center collet such that the center collet is closed and locks the retaining tip of the tool within the access hole.

2. The clamping assembly according to claim 1, wherein the exterior surface of the gripping portion of the center collet is tapered.

3. The clamping assembly according to claim 2, wherein the exterior surface of the gripping portion of the center collet has a low degree of taper.

4. The clamping assembly according to claim 1, wherein the interior surface of the gripping portion includes a tapered flange surrounding the recess and the tapered flange is configured to engage the retaining tip of the tool.

5. The clamping assembly according to claim 4, wherein the tapered flange of the gripping portion has a high degree of taper.

6. The clamping assembly according to claim 1, wherein the release device is configured to move the locking sleeve to an ejection position where the sleeve face of the locking sleeve protrudes from the access hole beyond the toolholder face of the toolholder body.

7. The clamping assembly according to claim 1, wherein the center collet includes a threaded portion extending from the gripping portion and, wherein the toolholder body further includes a threaded hole defined therein, the threaded hole extends into the toolholder body from the base surface of the access hole, and the threaded portion of the center collet engages the threaded hole in the toolholder body to fixedly connect the center collet to the toolholder body.

8. The clamping assembly according to claim 7, wherein the threaded portion of the center collet includes a coolant channel defined therein in fluid communication with the recess of the gripping portion and, wherein the toolholder body further includes a coolant hole extending through the toolholder body to the threaded hole, the coolant hole of the toolholder body being in fluid communication with the coolant channel in the center collet.

9. The clamping assembly according to claim 1, wherein the interior and exterior surfaces of the gripping portion of the center collet are defined by a plurality of spring fingers separated by slots and surrounding the recess.

10. The clamping assembly according to claim 9, wherein the center collet is made of a resilient material.

11. The clamping assembly according to claim 1, wherein a sealing member extends around a base of the gripping portion and engages the interior surface of the locking sleeve.

12. The clamping assembly according to claim 1, wherein the engaging portion of the locking sleeve is an interior flange positioned adjacent to the sleeve face.

13. The clamping assembly according to claim 1, wherein the spring assembly comprises a plurality of Belleville washers disposed beneath and engaging a base of the gripping portion, a flat washer for supporting the Belleville washers, and a snap ring engaging an annular groove formed in the interior surface of the locking sleeve for retaining and supporting the flat washer and the Belleville washers between the base of the gripping portion and the base surface of the locking sleeve.

14. The clamping assembly according to claim 1, wherein
the toolholder body further includes a transverse bore extending therethrough non-parallel to the access hole and at least partially intersecting with the access hole, and
the release device includes a rotatable pin positioned in the transverse bore of the toolholder body.

15. The clamping assembly according to claim 14, wherein the rotatable pin has an outer diameter and a recessed portion and the recessed portion and the outer diameter define a cam profile that engages the base surface of the locking sleeve.

16. The clamping assembly according to claim 15, wherein the recessed portion of the rotatable pin has a shape corresponding to the base surface of the locking sleeve.

17. A tool and toolholder assembly, comprising:
a tool having a tool seating face and a retaining tip extending from the tool seating face;
a toolholder body having an access hole defined therein, the access hole extending into the toolholder body from a toolholder face of the toolholder body to a base surface;
a locking sleeve slidably disposed within the access hole, the locking sleeve extending between a sleeve face and a base surface and having an interior surface defining a hollow cavity, the interior surface including an engaging portion extending into the hollow cavity;
a center collet disposed within the hollow cavity of the locking sleeve and fixedly connected to the toolholder body, the center collet including a gripping portion having an interior surface defining a recess and an exterior surface, the gripping portion being adapted to receive the retaining tip of the tool therein;
a spring assembly disposed within the hollow cavity of the locking sleeve and engaging the center collet and the locking sleeve to bias the locking sleeve toward the base surface of the access hole; and
a release device engaging the locking sleeve,
wherein the spring assembly and the release device are configured to cause the locking sleeve to move within the access hole between a load position where the engaging portion of the locking sleeve is disengaged from the exterior surface of the gripping portion of the center collet such that the center collet is open and the recess is able to receive the retaining tip of the tool and a lock position where the engaging portion of the locking sleeve engages the exterior surface of the gripping portion of the center collet such that the center collet is closed and locks the retaining tip of the tool within the access hole.

18. The tool and toolholder assembly according to claim 17, wherein
the interior surface of the gripping portion of the center collet includes a tapered flange surrounding the recess,
the retaining tip of the tool includes a reverse tapered surface,
the tapered flange of the gripping portion engages the reverse tapered surface in an interlocking manner when the locking sleeve is in the lock position and the center collet is closed.

19. The tool and toolholder assembly according to claim 17, wherein the release device is configured to move the locking sleeve to an ejection position where the sleeve face of the locking sleeve protrudes from the access hole beyond the toolholder face of the toolholder body and engages the tool seating face to push the tool away from the toolholder body.

20. A method of connecting a tool to a toolholder, comprising the steps of:
providing a tool having a tool seating face and a retaining tip extending from the tool seating face;
providing toolholder having a clamping assembly, the clamping assembly including:
a toolholder body having an access hole defined therein, the access hole extending into the toolholder body from a toolholder face of the toolholder body to a base surface;
a locking sleeve slidably disposed within the access hole, the locking sleeve extending between a sleeve face and a base surface and having an interior surface defining a hollow cavity, the interior surface including an engaging portion extending into the hollow cavity;
a center collet disposed within the hollow cavity of the locking sleeve and fixedly connected to the toolholder body, the center collet including a gripping portion having an interior surface defining a recess and an exterior surface, the gripping portion being adapted to receive the retaining tip of the tool therein;
a spring assembly disposed within the hollow cavity of the locking sleeve and engaging the center collet and the locking sleeve to bias the locking sleeve toward the base surface of the access hole; and
a release device engaging the locking sleeve;
actuating the release device to engage the locking sleeve to move the locking sleeve within the access hole to a load position where the engaging portion of the locking sleeve is disengaged from the exterior surface of the gripping portion of the center collet such that the center collet is open;
inserting the retaining tip of the tool into the recess of the gripping portion; and
actuating the release device to engage the locking sleeve such that the spring assembly moves the locking sleeve within the access hole to a locked position where the engaging portion of the locking sleeve engages the exterior surface of the gripping portion of the center collet such that the center collet is closed and locks the retaining tip of the tool within the access hole.

* * * * *